United States Patent
Biskeborn

(10) Patent No.: US 6,712,985 B2
(45) Date of Patent: Mar. 30, 2004

(54) METHOD AND APPARATUS FOR THE MANUFACTURE OF THIN FILM MAGNETIC TRANSDUCERS USING A COMPLIANT, SOFT LAPPING PROCESS

(75) Inventor: Robert Glenn Biskeborn, Hollister, CA (US)

(73) Assignee: Hitachi Global Storage Technologies (NL)

( * ) Notice: Subject to any disclaimer, the term of this patent is extended or adjusted under 35 U.S.C. 154(b) by 100 days.

(21) Appl. No.: 09/898,877

(22) Filed: Jul. 3, 2001

(65) Prior Publication Data

US 2003/0006213 A1 Jan. 9, 2003

(51) Int. Cl.[7] .............................................. G11B 5/127
(52) U.S. Cl. .............................. 216/22; 216/52; 216/53; 216/88; 216/89; 216/95; 29/603.15; 29/603.16
(58) Field of Search .............................. 216/22, 52, 53, 216/88, 89, 95; 29/603.15, 603.16

(56) References Cited

U.S. PATENT DOCUMENTS

| | | |
|---|---|---|
| 3,685,216 A | 8/1972 | Frey et al. |
| 3,810,334 A | 5/1974 | Povill |
| 3,881,195 A | 4/1975 | Ono et al. |
| 4,158,871 A | 6/1979 | Leaming |
| 4,183,819 A | 1/1980 | Stolove |
| 4,306,555 A | 12/1981 | Ritter |
| 5,109,637 A | 5/1992 | Calafut |
| 5,195,278 A | 3/1993 | Grove et al. |
| 5,387,457 A | 2/1995 | Sato et al. |
| 5,531,016 A | 7/1996 | Postma et al. |
| 5,585,981 A | 12/1996 | Lee et al. |

(List continued on next page.)

FOREIGN PATENT DOCUMENTS

| | | |
|---|---|---|
| GB | 8523454 | 9/1985 |
| JP | 53144315 | 12/1978 |
| JP | 59129926 | 7/1984 |

(List continued on next page.)

OTHER PUBLICATIONS

IBM Technical Disclosure Bulletin, "Finishing of Magnetic Ferrite," Aug. 1987, vol. 30, No. 3, p. 1366.

(List continued on next page.)

*Primary Examiner*—Anita Alanko
(74) *Attorney, Agent, or Firm*—Crawford Maunu PLLC

(57) ABSTRACT

A method and apparatus for the manufacture of thin film magnetic transducers using a compliant pad or mat or surface in a lapping process is disclosed. The lapping process is applied to heads to eliminate both ductile element connections between the MR and shields and poletip and shield protrusion. A lapping media is dispensed onto an interface surface of a compliant pad. Then, the interface surface is engaged to the surface of a head outside a region comprising transducers defining a head gap. The pad is then moved over the head in a direction parallel to the head gap while using a head rail to guide the pad. The soft, compliant pad conforms to the head rail to ensure parallel movement. The pad is typically not stopped at the elements, but rather moves from one end of the head to the other to prevent bridging and damage that might occur during start/stop on the delicate elements. The lapping media contains a combination of chemical and mechanical agents, wherein the chemical etchants are specifically adjusted to give a desired head profile for the poletips. The chemical etchants are formed by adding dilute acid, for example, to the conventional lapping media used at the interface surface. The added etchant selectively removes iron containing poles to advance the poletips below a surrounding insulator layer. Moving of the compliant pad causes the mechanical etchants to eliminate element bridges and smears between the MR element and shields.

11 Claims, 9 Drawing Sheets

U.S. PATENT DOCUMENTS

| | | | |
|---|---|---|---|
| 5,603,156 | A | 2/1997 | Biskeborn et al. |
| 5,735,036 | A | 4/1998 | Barr et al. |
| 5,749,769 | A | 5/1998 | Church et al. |
| 5,761,790 | A | 6/1998 | Carr et al. |
| 5,940,956 | A | 8/1999 | Jordan |
| 6,278,582 | B1 * | 8/2001 | Okawa et al. ............ 360/235.2 |

FOREIGN PATENT DOCUMENTS

| | | |
|---|---|---|
| JP | 60136006 | 7/1985 |
| JP | 62019367 | 1/1987 |
| JP | 04335202 | 11/1992 |
| JP | 5166321 | 7/1993 |
| JP | 7272211 | 10/1995 |
| JP | 9007139 | 1/1997 |

OTHER PUBLICATIONS

IBM Technical Disclosure Bulleing, "Diamond Lapping Pad," Aug. 1982, vol. 24, No. 11A, p. 5332.

IBM Technical Disclosure Bulletin, "Head–Cleaning Device," Jul. 1981, vol. 24, No. 2, pp. 1031 & 1032.

IBM Technical Disclosure Bulletin, "Cleaning and Passivating Process for Permalloy Recording Devices," Oct. 1980, vol. 23, No. 5, p. 2105.

IBM Technical Disclosure Bulletin, "Lapping Edge Blending Technique," Apr. 1976, vol. 18, No. 11, p. 3779.

IBM Technical Disclosure Bulletin, "Putting Small Radii on the Edges of a Ceramic Magnetic Transducer Part," Feb. 1976, vol. 18, No. 9, pp. 3002 & 3003.

* cited by examiner

METHOD AND APPARATUS FOR THE MANUFACTURE OF THIN FILM MAGNETIC TRANSDUCERS USING A COMPLIANT, SOFT LAPPING PROCESS

BACKGROUND OF THE INVENTION

1. Field of the Invention.

This invention relates in general to a method and apparatus for the manufacture of thin film magnetic transducers and, more particularly, to a manufacturing and lapping process for individual magnetoresistive (MR) heads which eliminates both ductile element bridges and smears between the MR and shields and poletip protrusion.

2. Description of Related Art

In high speed data processing systems, magnetic recording has been employed for large memory capacity requirements. In magnetic storage systems, data is read from and written onto magnetic recording media utilizing magnetic transducers commonly referred to as magnetic heads. Data is written on the magnetic material by moving a magnetic recording head to a position over the magnetic material where the data is to be stored. The magnetic recording head then generates a magnetic field, which encodes the data into the magnetic material. Data is read from the disk by similarly positioning the magnetic head and then sensing the magnetic field of the magnetic material. The positioning of the magnetic recording head is accomplished by continually moving the media supporting the magnetic material while positioning the magnetic head relative to the surface of the magnetic material. Read and write operations are synchronized with the movement of the media to insure that the data is read from and written to the desired location on the magnetic material.

In a magnetic disk drive system, for example, one or more magnetic recording disks are mounted on a spindle such that the disks rotate to permit the magnetic head mounted on a moveable arm in a position closely adjacent the disk surface to read or write information thereon.

During operation, an actuator mechanism moves the magnetic transducer to a desired radial position on the surface of the rotating disk where the head electromagnetically reads or writes data. Typically, the magnetic head is integrally fabricated in a carrier or support referred to as a "slider". The slider generally serves to mechanically support the head and any electrical connections between the head and the remainder of the disk drive system. The slider is aerodynamically shaped to glide over moving air and therefore to maintain a uniform distance from the surface of the rotating disk.

Likewise, thin film magnetic tape heads are regularly used to store data on a magnetizable tape recording medium employing known principals. Conventional thin film tape heads are fabricated using processes similar to those used in DASD heads. The process provides a plurality of layers deposited on the surface of a substrate. A closure piece is provided to support the tape and so protect the delicate elements. For example, the layers may include a bottom layer, a bottom pole, a gap layer, a coil and a top pole. As with DASD processes, the resulting topography of these layers is non-planar and thus it is necessary to apply a thick top layer that can be lapped into a planar surface for the final step of providing electrical contacts. In addition a planar surface is required for bonding the tape head closure to ensure a very small gap between the closure and the top layer.

One parameter that must be controlled during the design and fabrication of magnetic heads which can affect the amount of information which may be stored on the magnetic material is the distance between the magnetic recording head and the surface of the disk. As this distance is reduced, the spatial density of binary information encoded on the disk may be increased. Typically a magnetic head for disk recording is formed on a slider with one surface having rails separated by a recessed area between the rails and with the rails having a ramp at the leading edge. The surface of rails that glides over the disk surface during operation is referred to as the air bearing surface.

In contrast, in a tape drive system the slider air bearing surface is typically contoured providing a cylindrical or curved surface facing the magnetic tape media. Recently, however, flat air bearing tape heads have been employed. Moving magnetic tape over the air bearing surface at high speed, generally entrains a film of air between the head and tape. Usually the tape head is designed to minimize the spacing between the head and the tape.

The magnetic head may use inductive electromagnetic devices with magnetic pole pieces which are used to read the data from or write data onto the recording media. Alternatively, the magnetic head may include a magnetoresistive read element shielded between magnetic pole pieces, now generally referred to as shields, for separately reading the recorded data, while the inductive head serves only to write the data. In either case, the inductive head magnetic pole pieces and the MR head elements and shield pieces terminate on the air bearing surface and function to electromagnetically interact with the magnetic media.

In the manufacture of such magnetic read/write heads, sliders are fabricated from a single wafer having rows of the magnetic transducers deposited simultaneously on the wafer surface utilizing conventional thin film process technology. After the thin film processing, sliders having a generally flat air bearing surface may be batch processed, wherein a number of the sliders are further processed in row bars, which can be sliced from the wafer.

In order to achieve optimum efficiency from the magnetic heads, the sensing elements must have a poletip height dimension commonly referred to as throat height for the thin film inductive write heads, or element height in the case of the MR read heads, which must be maintained within a certain limited tolerance for writing and reading back optimum signals from the medium. During the slider mechanical processing, it is critical to grind or lap the slider surface to achieve the desired throat height and MR element height for the magnetic head.

A method of producing a required element height includes a lapping stage in which an abrasive lapping or grinding surface accurately finishes the inductive write poletips and MR elements to a desired length (i.e., height). Suitable techniques for controlling the MR element height during the lapping operation include measuring the resistance of the MR element as it is lapped to the final element height. The change in resistance of the MR element at any given time during the lapping operation indicates the amount of the material that has been removed from the elements. Since the resistance of the MR element is inversely proportional to the height of MR material remaining, the resistance at any given time during lapping is an indication of the element height of the MR element being lapped. A target resistance is calculated and the elements are lapped to achieve the desired target resistance value.

Prior art conventional lapping processes utilize either oscillatory or rotary motion of the work piece (i.e., the row bar) across either a rotating or rotating and oscillating lapping plate to provide a random motion of the work piece over the lapping plate and randomize plate imperfections across the head surface in the course of lapping. For example, see U.S. Pat. No. 4,536,992 granted to Hennenfent on Aug. 27, 1985 wherein a work piece is supported by the free end of a pivotally mounted arm on the surface of a rotating lapping plate. During the lap process, the motion of abrasive grit carried on the surface of the lapping plate is typically transverse to (i.e. across) the magnetic head elements exposed at the slider air bearing surface. In magnetic heads, particularly MR heads, the electrically active components exposed at the air bearing surface can be made of relatively soft (i.e. ductile) materials. During the lapping process, the electrically active MR elements and/or shields can scratch and smear or plow into each other causing electrical shorts and degraded head performance. With high density recording MR heads, the plowing can become severe enough to result in substantial manufacturing yield loss due to element shorting and telegraph noise. Another possibility is the lapping can result in shields protruding above the insulation layers adjacent to the MR element. This can later lead to massive shorting failure in the tape drive as the tape passes over protruded poles, and bulldozes the soft protruding pole or poles in the elements, thus short circuiting the elements.

International Business Machines Corporation, assignee of the current application, has developed a linear lapping process for disk head processing in which the rows are finished by lapping parallel to the gap line. This can also be used for flat contoured tape heads. However, this process only solves the bridging problem, and does not address the poletip protrusion problem, and it is not easily implemented for contoured tape heads.

It can be seen then that there is a need for a lapping process for flat and contoured tape heads that eliminates both ductile element smears between the MR and shields and protrusion of the poletips above the insulating layers adjacent to the MR element.

SUMMARY OF THE INVENTION

To overcome the limitations in the prior art described above, and to overcome other limitations that will become apparent upon reading and understanding the present specification, the present invention discloses a method and apparatus for the manufacture of thin film magnetic transducers using a compliant, soft lapping process.

The present invention solves the above-described problems by providing a lapping process for flat and contoured tape heads that greatly reduces both ductile element connections between the MR and shields and poletip protrusion.

A method in accordance with the principles of the present invention includes dispensing lapping media onto an interface surface of a compliant pad, engaging the interface surface to the surface of a head outside a region comprising magnetic transducers defining a head gap and moving the pad over the head in a direction parallel to the head gap while using preferably a head rail to guide the pad. If such a feature is not available, then the same thing can be achieved with guides.

Other embodiments of a method in accordance with the principles of the invention may include alternative or optional additional aspects. One such aspect of the present invention is that the moving further comprises oscillating the pad linearly over the head parallel to the head gap.

Another aspect of the present invention is that the lapping media contains a combination of chemical and mechanical agents.

Another aspect of the present invention is that the chemical agents are etchants that are specifically adjusted to give a desired head profile for the poletips and shields.

Another aspect of the present invention is that the chemical agents are formed by adding dilute acid to the conventional lapping media used at the interface surface.

Another aspect of the present invention is that the added dilute acid selectively removes iron containing poles and shields to advance the poletips below a surrounding insulator layer.

Another aspect of the present invention is that the magnetic head comprises an MR element and shields defining an MR read sensor, and wherein the moving of the soft, compliant pad causes the agents to eliminate element conducting connections and smears between the MR element and shields.

Another aspect of the present invention is that the compliant pad is relatively soft and conforms to the head rail which serves as a guide resulting in parallel movement during the lapping.

Another aspect of the present invention is that the soft, compliant pad comprises a fabric swab.

Another aspect of the present invention is that the moving further comprises moving the pad from one end of the head to another and reversing the direction without stopping on the elements.

In another embodiment of the present invention, a magnetic head is manufactured by dispensing lapping media onto an interface surface of a compliant pad, engaging the interface surface to the surface of a head outside a region comprising transducers defining a head gap and moving the pad over the head in a direction parallel to the head gap while using a head rail to guide the pad.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

First.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for the manufacture of thin film magnetic transducers using a compliant, soft lapping process. A lapping process is provided for flat and contoured tape heads that eliminates ductile element bridges and/or connections between the MR and shields and protrusion of poletips above the MR insulators.

Figure 1A:
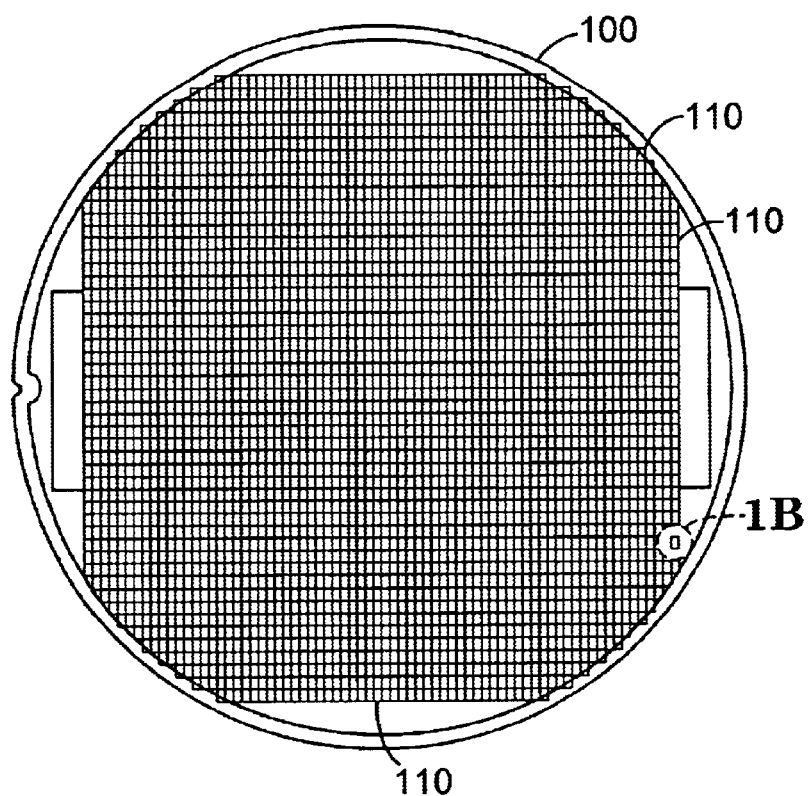
FIG. 1A is a top view of a wafer with a plurality of magnetic heads formed thereon.
Figure 1B:
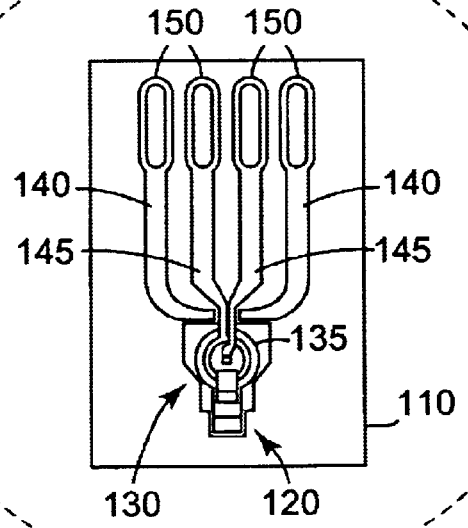
FIG. 1B is an enlarged top view of one of the magnetic heads completed on the wafer.

FIG. 1A is a top view of a wafer with a plurality of magnetic heads formed thereon. FIG. 1B is an enlarged top view of one of the magnetic heads completed on the wafer. Processing begins with a conventional wafer 100 comprising, for example alumina/titanium-carbide. As will be described herein, a plurality of magnetic heads 110 are fabricated on a single wafer utilizing semiconductor-like processing methods, which will be described in greater detail subsequently.

FIG. 1B is a magnified view of the top surface of one completed magnetic head 110. The magnetic head includes a magnetoresistive head illustrated generally at 120 and an inductive head illustrated generally at 130, including a coil 135. A first pair of leads 140 connect the MR head shown generally at 120 and a second pair of leads 145 are connected to the inductive head. Each lead includes a pad 150 for connection with a wire (not shown) that leads to external circuitry that supplies and receives appropriate signals for reading and writing.

Thin-film heads disclosed herein are defined as having both a magnetoresistive (MR) element (sometimes referred to as a "sensor") for reading data from a magnetic medium, and an inductive element for writing to the magnetic medium. The MR element and the inductive element are formed either in a stacked or side-by-side (i.e., for tape heads only) assembly.

Figure 2A:
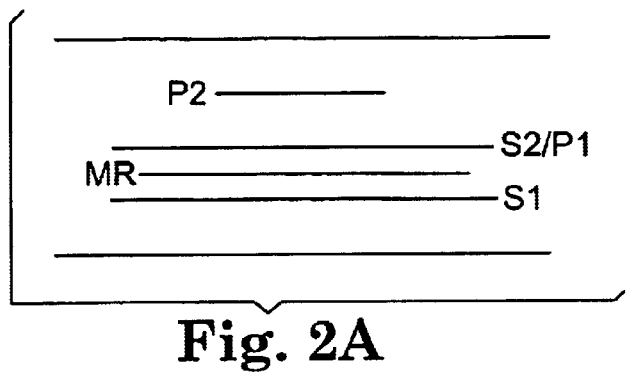
FIG. 2A is a simple diagram of a merged head.

FIG. 2A is a simple diagram of a merged head. In FIG. 2A, the MR element is shown disposed between the first shield and the second shield. The second shield also acts as a first pole for an inductive write head that is completed with the second pole.

Figure 2B:
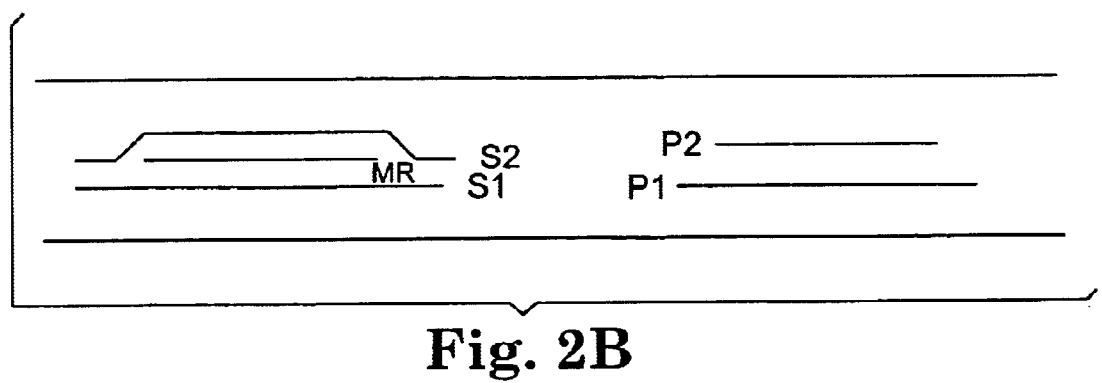
FIG. 2B is a simple diagram of a side-by-side head.

FIG. 2B is a simple diagram of a side-by-side head. In FIG. 2B, the MR read head is shown to the left and includes the MR element and a first and second magnetic shield. The write head is formed beside the read head, here to the right of the MR read head. The write head is formed by the first and second poles.

Figure 3A:
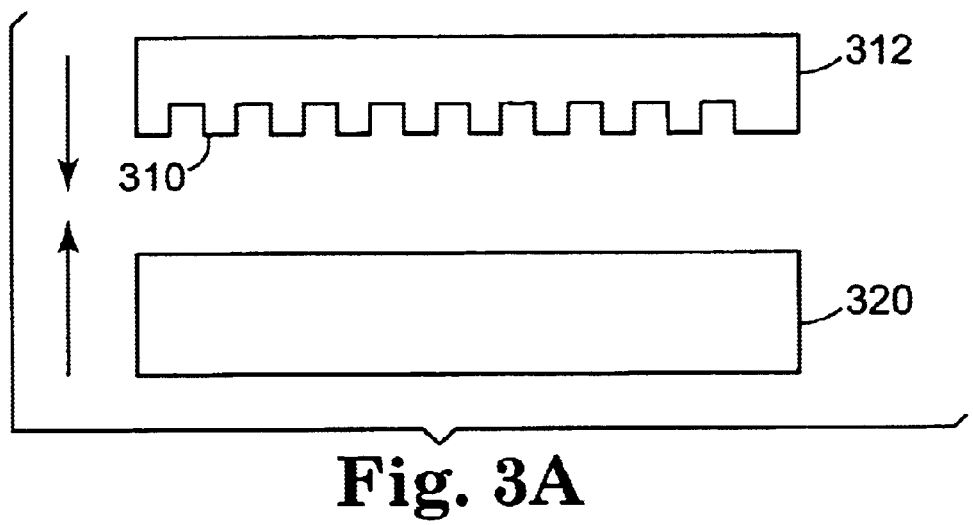
FIGS. 3A–C illustrates the manufacture of magnetic read/write heads as described above in FIGS. 2A–B.
Figure 3B:
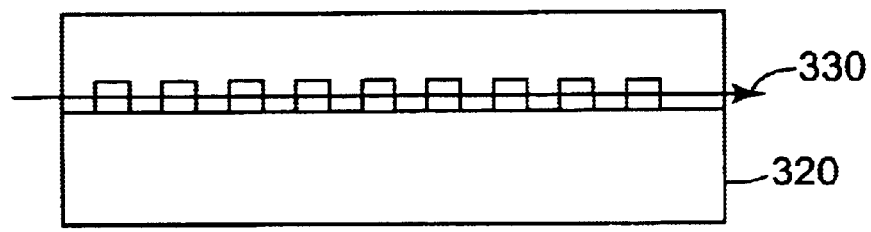
Figure 3C:
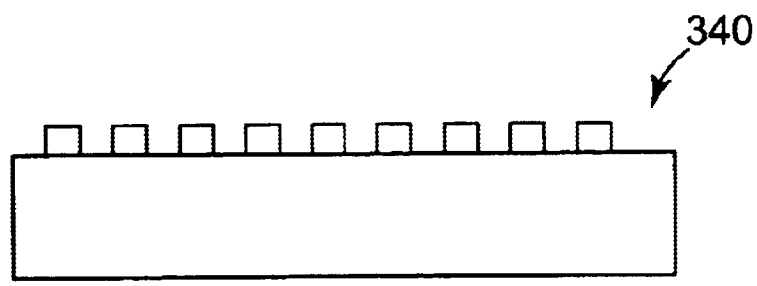

FIG. 3A–C illustrates the manufacture of magnetic read/write heads as described above in FIGS. 2A–B. FIG. 3A shows a closure piece 312 with slots 310. FIG. 3B shows the closure piece (Al—TiC) 312 being attached to the wafer 320. Finally, FIG. 3C shows a wafer having rows of closure rows between contacts after grinding off the incremented portions along line 330. After this, the edge of the wafer with closures is lapped to create the tape bearing surface. In order to achieve optimum efficiency from the magnetic heads, the sensing elements must have a poletip height dimension commonly referred to as throat height for the thin film inductive heads, or element height in the case of the MR read heads, which must be maintained within a certain limited tolerance for generating an optimum signal from a given head element. During the slider mechanical processing, it is critical to grind or lap the slider surface to achieve the desired throat height and MR element height for the magnetic head.

Figure 4:
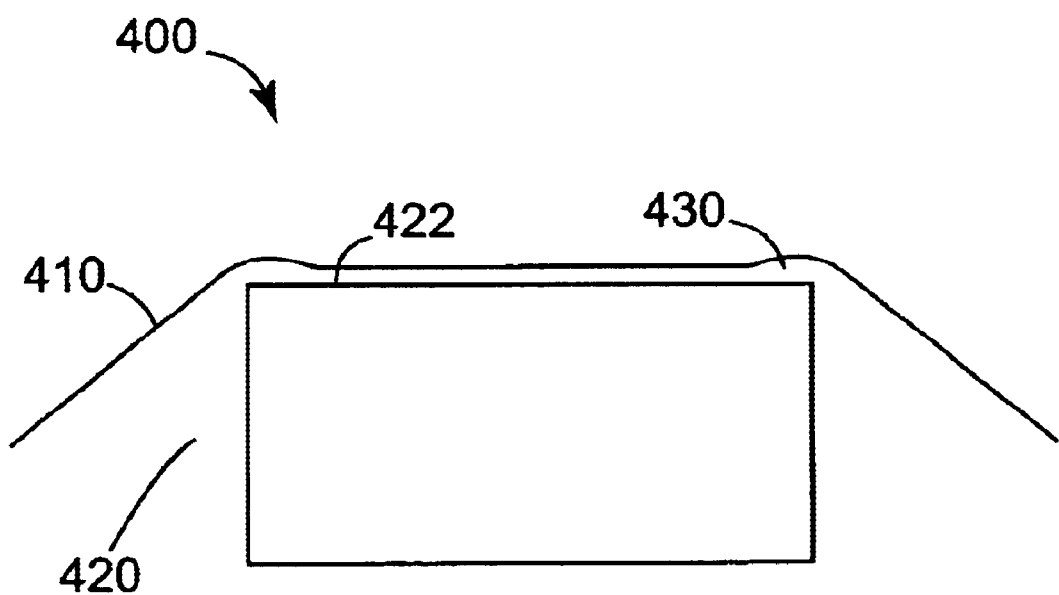
FIG. 4 shows a tape drive system wherein the tape glides over the surface of the tape head.

FIG. 4 shows a tape drive system 400. The tape 410 wraps over the tape bearing surface 422 of the tape head 420. The moving magnetic tape passes over the air bearing surface 422 of the tape head 420 at high speed. A layer of air of subambient pressure 430 is represented in the spacing between the tape media 410 and the tape head 420. The magnetic performance of the head is dependent upon the distance between the magnetic recording head and the surface of the recording media. In order to achieve optimum efficiency from the magnetic heads, the induction recording elements must have a poletip height dimension commonly referred to as throat height and a stripe height in the case of the MR read heads, which must be maintained within a certain limited tolerance for generating an optimum signal from a given head element. During the slider mechanical processing, it is critical to grind or lap the slider surface to achieve the desired throat height and MR element height for the magnetic head.

Figure 5:
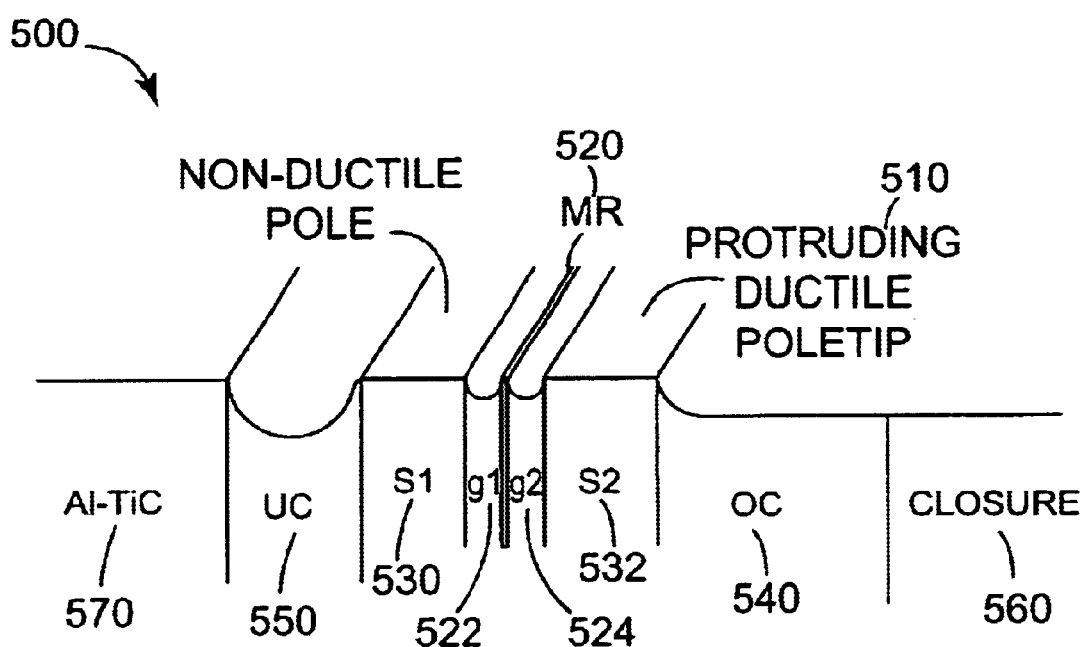
FIG. 5 is a view of a head showing the poletip protrusion.

FIG. 5 is a view of a head 500 showing the poletip protrusion. In FIG. 5, the MR element 520 is disposed between two insulating layers, g1 522 and g2 524. On either side of the insulation layers are shields 530, 532. The first shield 530 forms a typically non-ductile pole. The second shield 532 is a ductile pole. Note that the second shield 532 protrudes above the level of the MR element 520 and the insulating layer g2 542. The undercoat 550, closure 560 and the Al—TiC substrate layer 570 form the remaining layers of a rail comprising the elements of an MR head 500.

Figure 6:
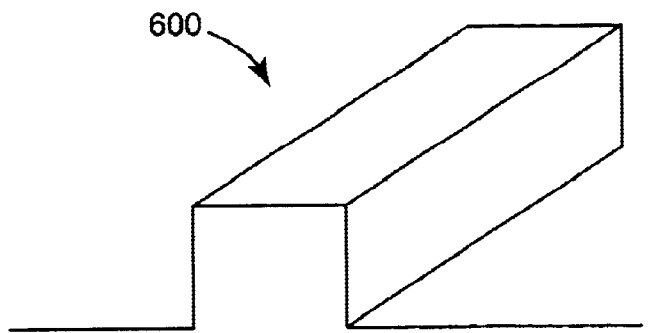
FIG. 6 is a closeup view of a rail comprising the elements of a MR head.
Figure 7A:
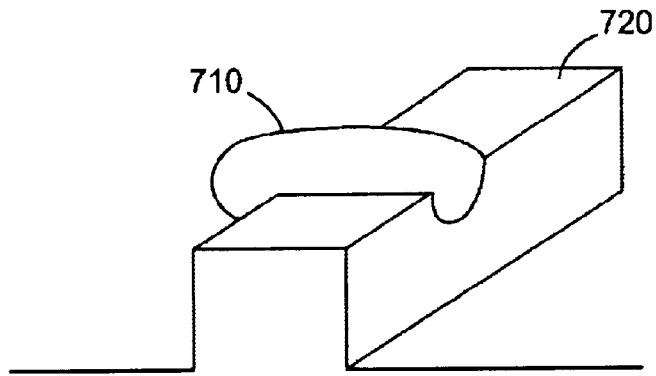
FIG. 7A shows a compliant pad being applied to the rail to remove the effects of ductile connections and to obtain the desired head poletip profile.
Figure 7B:
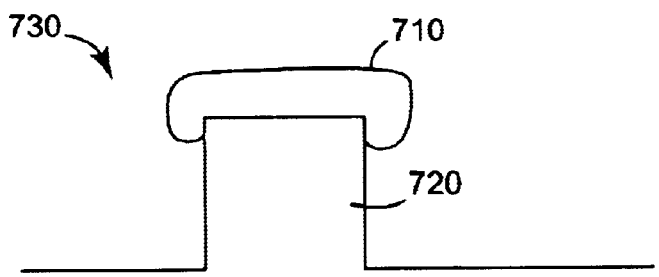
FIG. 7B is a side view of the rail and the compliant pad as used according to the present invention.

FIG. 6 is a closeup view of a rail 600 comprising the elements of an MR head. The rail may be flat or curved. FIG. 7A shows a compliant pad 710 being applied to the rail 720 to remove the effects of ductile bridges and to obtain the desired head poletip profile. FIG. 7B is a side view 730 of the rail 720 and the compliant pad 710 as used according to the present invention. The compliant pad 710 can be seen as conforming to the shape of the rail.

Figure 8:
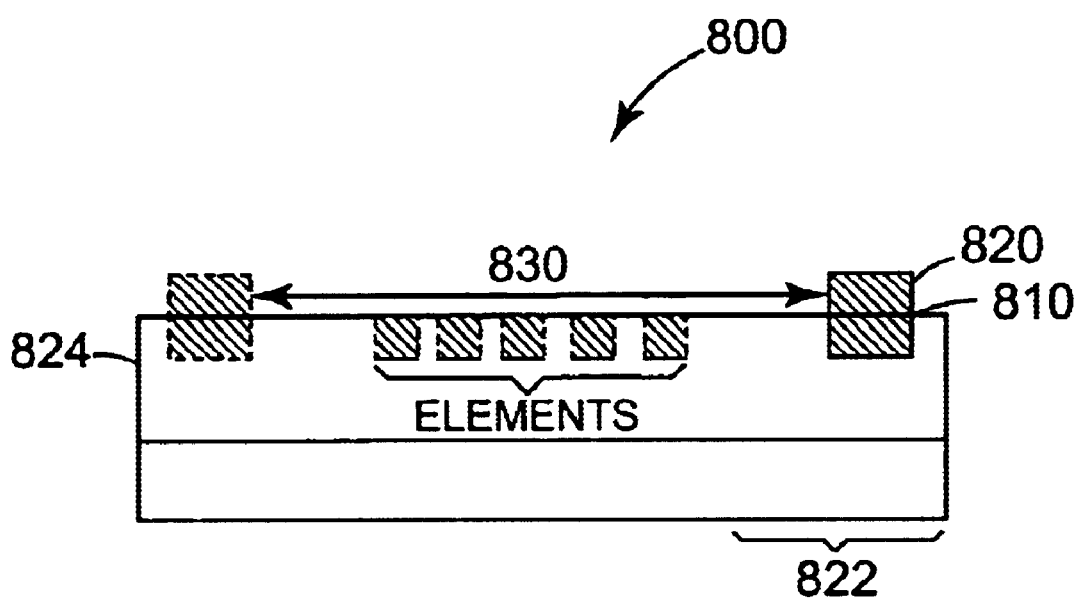
FIG. 8 illustrates the compliant, soft lapping process used to remove the effects of ductile bridging and to obtain the desired head poletip profile according to the present invention.

According to the present invention, a finishing process 800 is then used to remove the effects of ductile smearing and to obtain the desired head poletip profile as shown in FIG. 8. The finishing process according to the present invention includes dispensing lapping media, which contains a combination of chemical etchants and mechanical agents, onto an interface surface 810 of a compliant pad 820. The lapping media is then applied to the surface of the head 822 outside the region of the elements. The pad 820 is oscillated over the surface of the head in a direction 830 parallel to the gap. To get the required surface finish the pad 820 must move very precisely parallel to the elements. The head rail or rails 824 are used to guide the pad 820 for highly linear motion, and the chemistry of the agents is specifically adjusted to give the desired head poletip/shield profile. This present invention achieves the required parallelism because the compliant pad 820 conforms to the head rail 824, which then acts as a guide. This solves the motion requirement. The protrusion requirement is solved by adjusting the lapping media composition. In particular, the addition of dilute phosphoric acid, for example, to conventional lapping slurry selectively removes iron containing poles, resulting in net recession below surrounding insulators, g1 and g2.

Figure 9:
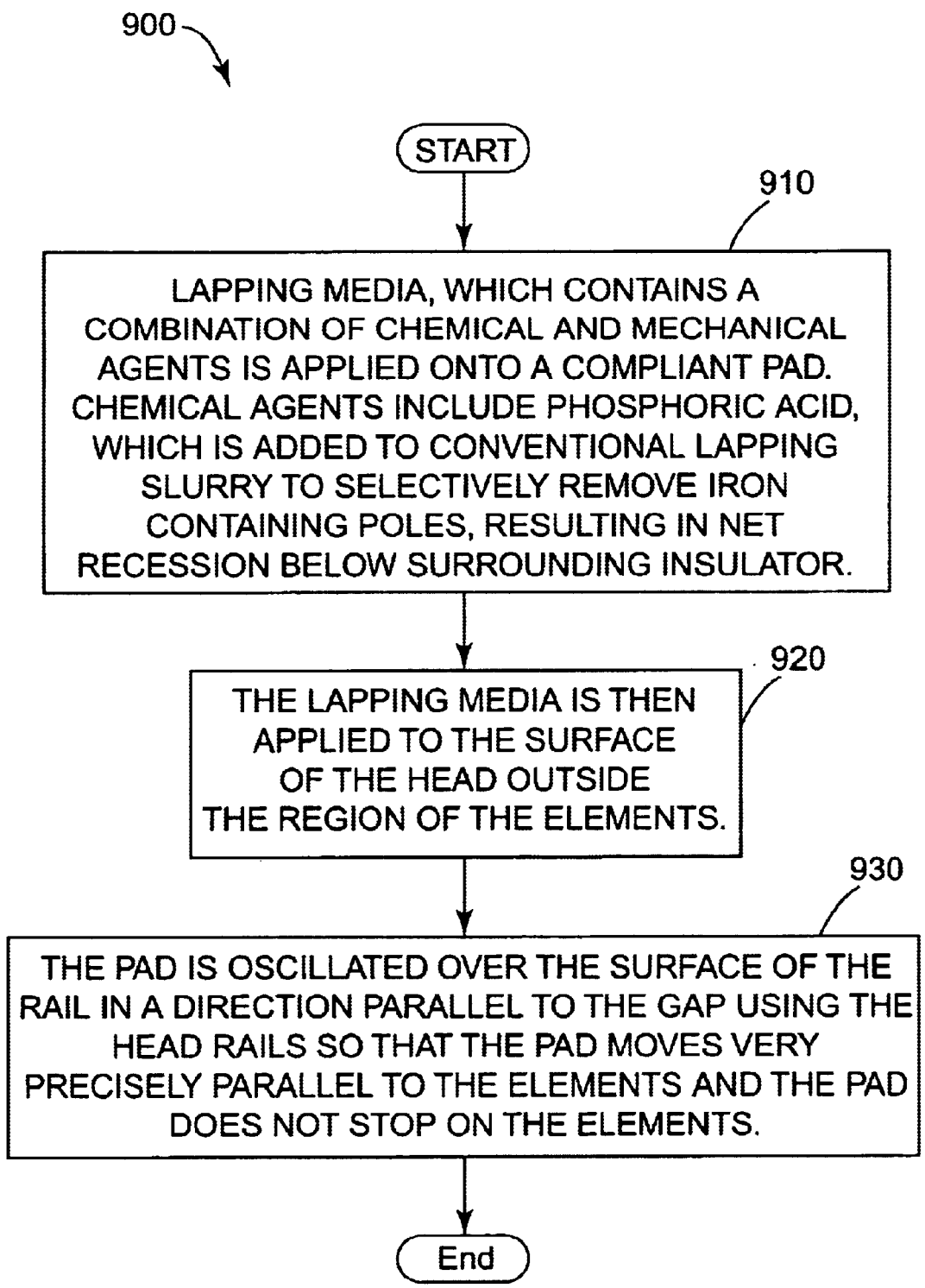
FIG. 9 illustrates a flow chart of the compliant, soft lapping process according to the present invention.

FIG. 9 illustrates a flow chart 900 of the lapping process using a compliant pad according to the present invention. Lapping media, which contains a combination of chemical and mechanical agents, is applied onto a compliant pad 910. The pH of the slurry is typically made acidic by first adding an acid, e.g., phosphoric acid, resulting in selective removal of iron containing poles, providing a net recession below the surrounding insulators g1 and g2. The lapping media is then applied to the surface of the head outside the region of the elements 920. The pad is oscillated over the surface of the head in a direction parallel to the gap using the head rails so that the pad moves very precisely parallel to the elements 930.

Figure 10:
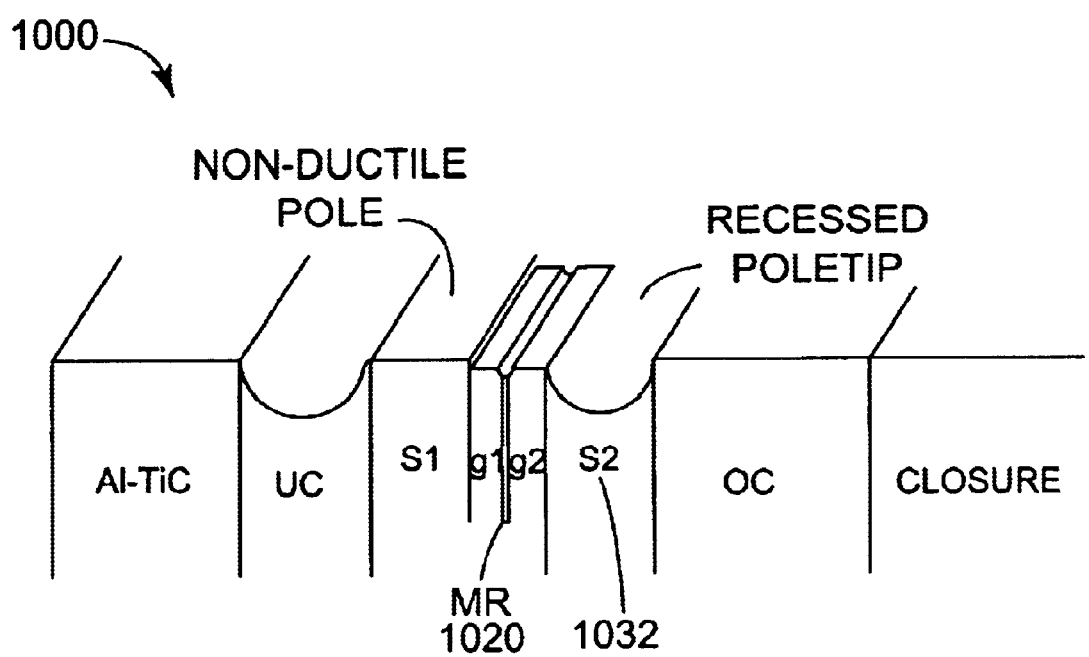
FIG. 10 shows the head of FIG. 5 after the compliant, soft lapping process of the present invention.

FIG. 10 shows the head 1000 of FIG. 5 after the compliant, soft lapping process of the present invention. FIG. 10 shows the second shield 1032 now being recessed thereby providing the desired throat height a desired height for the MR element 1020 for the magnetic head 1000.

Those skilled in the art will recognize that the lapping process for flat and contoured tape heads that eliminates both ductile element connections between the MR and shields and poletip protrusion according to the invention are not limited to the particular assemblies described herein, but are in fact applicable to other assemblies such as spin valve sensors, and anisotropic magneto-resistive (AMR) heads and giant magneto-resistive (GMR) heads. Further, the magnetic head formed according to the process described herein can be utilized within conventional tape drive units that are used to back up other storage systems or for general purpose recording on other magnetic data storage devices. In a typical configuration, a computer installation includes direct access memory unit such as a disk drive for immediate storage and retrieval, and a magnetic tape drive for back-up storage of information stored within the direct access memory.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for performing a finishing lapping process to a magnetic head, comprising:
    dispensing lapping media onto an interface surface of a compliant pad;
    engaging the interface surface to the surface of a head outside a region comprising magnetic transducers defining a head gap; and
    moving the pad over the head in a direction parallel to the head gap while using a head rail to guide the pad.

2. The method of claim 1 wherein the moving further comprises oscillating the pad linearly over the head parallel to the head gap.

3. The method of claim 1 wherein the lapping media contains a combination of chemical and mechanical agents.

4. The method of claim 3 wherein the chemical etchants are etchants specifically adjusted to give a desired head profile for the poletips and shields.

5. The method of claim 4 wherein the etchants are formed by adding dilute acid to the lapping media used at the interface surface.

6. The method of claim 3 wherein the added etchant selectively removes iron containing poles and shields to advance the poletips below a surrounding insulator layer.

7. The method of claim 5 wherein the magnetic head comprises a MR element and shields defining a MR read sensor, and wherein the moving of the soft, compliant pad causes the mechanical agents to eliminate element conducting connections and smears between the MR element and shields.

8. The method of claim 7 wherein the moving further comprises moving the pad from one end of the head to another and reversing the direction without stopping on the elements.

9. The method of claim 1 wherein the soft, compliant pad conforms to the head rail to provide a parallel movement during the moving.

10. The method of claim 1 wherein the soft, compliant pad comprises a fabric mat.

11. The method of claim 1 wherein the fabric mat comprises a cotton mat.

* * * * *

UNITED STATES PATENT AND TRADEMARK OFFICE
CERTIFICATE OF CORRECTION

PATENT NO. : 6,712,985 B2
DATED : March 30, 2004
INVENTOR(S) : Biskeborn

It is certified that error appears in the above-identified patent and that said Letters Patent is hereby corrected as shown below:

Title page,
Item [73], Assignee, "Hitachi Global Storage Technologies (NL)" should read
-- Hitachi Global Storage Technologies Netherlands B.V. --
Item [56], References Cited, OTHER PUBLICATIONS, "IBM Technical Disclosure Bulleing, "Diamond Lapping Pad," Aug. 1982, vol. 24, No. 11A, p. 5332." Reference should read -- IBM Technical Disclosure Bulletin, "Diamond Lapping Pad," Aug. 1982, vol. 24, No. 11A, p. 5332. --

Column 8,
Line 27, "claim 3" should read -- claim 5 --.
Line 30, "claim 5" should read -- claim 3 --.

Signed and Sealed this

Twenty-eighth Day of June, 2005

JON W. DUDAS
*Director of the United States Patent and Trademark Office*